US012201152B2

(12) United States Patent
Hu et al.

(10) Patent No.: US 12,201,152 B2
(45) Date of Patent: Jan. 21, 2025

(54) ATOMIZER AND ELECTRONIC CIGARETTE

(71) Applicant: SHENZHEN FIRST UNION TECHNOLOGY CO., LTD., Shenzhen (CN)

(72) Inventors: Ruilong Hu, Shenzhen (CN); Yunkai Zhang, Shenzhen (CN); Senbing Zhao, Shenzhen (CN); Zhongli Xu, Shenzhen (CN); Yonghai Li, Shenzhen (CN)

(73) Assignee: SHENZHEN FIRST UNION TECHNOLOGY CO., LTD., Shenzhen (CN)

( * ) Notice: Subject to any disclaimer, the term of this patent is extended or adjusted under 35 U.S.C. 154(b) by 437 days.

(21) Appl. No.: 17/597,853

(22) PCT Filed: Aug. 7, 2020

(86) PCT No.: PCT/CN2020/107830
§ 371 (c)(1),
(2) Date: Jan. 26, 2022

(87) PCT Pub. No.: WO2021/023301
PCT Pub. Date: Feb. 11, 2021

(65) Prior Publication Data

US 2022/0279850 A1 Sep. 8, 2022

(30) Foreign Application Priority Data

Aug. 7, 2019 (CN) ......................... 201921283730.1

(51) Int. Cl.
*A24F 40/46* (2020.01)
*A24F 40/10* (2020.01)
(Continued)

(52) U.S. Cl.
CPC .............. *A24F 40/46* (2020.01); *A24F 40/10* (2020.01); *A24F 40/44* (2020.01); *H05B 3/0033* (2013.01)

(58) Field of Classification Search
CPC .......... A24F 40/10; A24F 40/20; A24F 40/44; A24F 47/00; A24F 40/46; H05B 3/0033
See application file for complete search history.

(56) References Cited

U.S. PATENT DOCUMENTS 8,910,640 B2 * 12/2014 Sears et al. ............. A24F 47/00 131/273
2015/0272218 A1 * 10/2015 Chen ....................... A24F 47/00
(Continued)

FOREIGN PATENT DOCUMENTS

CN 104055223 A 9/2014
CN 105559147 A 5/2016
(Continued)

OTHER PUBLICATIONS

ResearchGate, <https://www.researchgate.net/publication/237089628_Far_infrared_radiation_FIR_Its_biological_effects_and_medical_applications> Retrieved May 22, 2024 (Year: 2012).*

*Primary Examiner* — Christopher M Rodd
*Assistant Examiner* — Ronnie Kirby Jordan
(74) *Attorney, Agent, or Firm* — Proi Intellectual Property US

(57) ABSTRACT

An atomizer and an electronic cigarette, the atomizer comprising: a housing, provided with a liquid storage chamber used to store e-liquid; a liquid guide element disposed in the housing, the liquid guide element having an atomization surface, and the liquid guide element being used to absorb some e-liquid in the liquid storage chamber and being capable of transferring the e-liquid to the atomization surface; and a radiating light source, having at least one radiation generating surface, the atomization surface facing
(Continued)

the radiating light source and the radiating light source and the atomization surface being separated by a set distance, the radiation generating surface having provided thereon a far-infrared radiating component, the far-infrared radiating component being used to emit infrared light and at least partly radiate onto the atomization surface, so as to heat e-liquid near the atomization surface and generate an aerosol.

19 Claims, 6 Drawing Sheets

(51) Int. Cl.

| | |
|---|---|
| ***A24F 40/44*** | (2020.01) |
| ***H05B 3/00*** | (2006.01) |

(56) References Cited

U.S. PATENT DOCUMENTS

| | | | | |
|---|---|---|---|---|
| 2016/0021930 | A1 | 1/2016 | Minskoff et al. | |
| 2017/0020190 | A1* | 1/2017 | Chang et al. | A24F 47/00 |
| 2018/0140018 | A1* | 5/2018 | Hu et al. | A24F 47/00 |
| 2019/0142071 | A1 | 5/2019 | Seok | |

FOREIGN PATENT DOCUMENTS

| | | | |
|---|---|---|---|
| CN | 105725281 | A | 7/2016 |
| CN | 206603240 | U | 11/2017 |
| CN | 207125321 | U | 3/2018 |
| CN | 109380766 | A | 2/2019 |
| CN | 208875406 | U | 5/2019 |
| CN | 109846093 | A | 6/2019 |
| CN | 210782909 | U | 6/2020 |
| WO | 2013034459 | A1 | 3/2013 |

* cited by examiner

ATOMIZER AND ELECTRONIC CIGARETTE

TECHNICAL FIELD

The present disclosure relates to the technical field of smoking sets, and in particular to an atomizer and an electronic cigarette.

BACKGROUND

Electronic cigarette, as an electronic product simulating a traditional cigarette, can generate aerosol, taste and feeling similar to the traditional cigarette. The electronic cigarette mainly employs an atomizer to heat and atomize an e-liquid containing nicotine salts to generate an aerosol, for a user to inhale. Therefore, the effect of the atomizer heating and atomizing the e-liquid directly affects the user experience of the electronic cigarette. Current atomizers mostly employ a heating wire or a heating body provided with a printed circuit to heat the e-liquid. However, these heating bodies have a limited atomization area, which cannot adapt to a large atomization surface, cannot generate a large amount of smoke, cannot meet the needs of some users for a large amount of smoke, and, furthermore, has a low efficiency of heating and a long time of preheating; consequently, the user needs to wait a long time before he/she can inhale, thus the user experience is not good.

SUMMARY

The present disclosure mainly aims to provide an atomizer and an electronic cigarette which can adapt to a large atomization surface and have a high efficiency of heating.

In order to achieve the above aim, the technical scheme employed by the present disclosure is an atomizer, including:

a housing, which is provided with a liquid storage chamber configured for storing an e-liquid;

a liquid guide element, which is disposed in the housing, wherein the liquid guide element has an atomization surface, the liquid guide element is configured for absorbing some e-liquid in the liquid storage chamber and is capable of transferring the e-liquid to the atomization surface;

and a radiating light source, which has at least one radiation generating surface, wherein the atomization surface faces the radiating light source and the radiating light source is arranged spaced from the atomization surface by a set distance, the radiation generating surface has provided thereon a far-infrared radiating component, and the far-infrared radiating component is configured for emitting far infrared light which at least partly radiates onto the atomization surface, so as to heat the e-liquid near the atomization surface to generate an aerosol.

Preferably, the radiation generating surface and the atomization surface are both straight planes, and the radiation generating surface is parallel to the atomization surface.

Preferably, the far-infrared radiating component extends inside the radiation generating surface, and a projection of the far-infrared radiating component on the atomization surface at least covers the atomization surface.

Preferably, the liquid storage chamber defines a liquid outlet, the liquid guide element further has a liquid absorption surface, the liquid absorption surface faces the liquid outlet, and the e-liquid inside the liquid storage chamber permeates to the atomization surface from the liquid absorption surface.

Preferably, the liquid guide element includes at least one of microporous ceramic body, porous glass, cellucotton and foam metal.

Preferably, the radiating light source includes a substrate capable of being transmitted by far infrared light, the substrate is arranged spaced from the liquid guide element, the radiation generating surface is one surface of the substrate, the far-infrared radiating component is a far-infrared coating applied on the radiation generating surface, and the far-infrared coating is capable of emitting far infrared light after electrified.

Preferably, the radiation generating surface is a surface on one side of the substrate away from the atomization surface, and the infrared light emitted by the far-infrared coating after the far-infrared coating is electrified passes through the substrate to radiate onto the atomization surface.

Preferably, the radiating light source further includes a conductive portion, and the conductive portion is arranged on the substrate and is in electrical connection with the far-infrared coating.

Preferably, the conductive portion is a conductive coating applied on the substrate, the conductive coating includes a positive electrode coating and a negative electrode coating, and both the positive electrode coating and the negative electrode coating are in electrical connection with the far-infrared coating.

Preferably, the conductive portion is a conductive sheet arranged on the substrate, the conductive sheet includes a positive electrode sheet and a negative electrode sheet, and both the positive electrode sheet and the negative electrode sheet are in electrical connection with the far-infrared coating.

Preferably, the atomizer further includes a heat insulation plate, wherein the heat insulation plate is arranged on one side of the radiating light source away from the atomization surface.

Preferably, one side of the heat insulation plate close to the radiation generating surface has a far-infrared reflective coating applied thereon, and the far-infrared reflective coating is configured for reflecting the far infrared light emitted by the far-infrared radiating component.

Preferably, the heat insulation plate presses against the radiating light source, one side of the heat insulation plate close to the radiation generating surface defines a groove, and the far-infrared reflective coating is disposed inside the groove.

Preferably, the housing further defines an air channel, an atomization area formed by an interval between the liquid guide element and the radiating light source forms one portion of the air channel, and the aerosol escapes from the atomization surface and is released into the atomization area.

Preferably, the air channel includes an air inlet section, an atomization area and an air outlet section that are communicated in sequence, the radiating light source and the liquid guide element are arranged spaced on two opposite sides of the atomization area, and the air outside the housing flows into the housing via the air inlet section, passes through the atomization area and then is discharged out of the housing via the air outlet section to carry away the aerosol in the atomization area.

The present disclosure further provides an electronic cigarette, including an atomizer and a battery assembly, wherein the battery assembly is configured for supplying power to the atomizer, and the atomizer is any one described above.

According to the atomizer and the electronic cigarette provided in the present embodiment, inside the housing are provided a liquid storage chamber and an liquid guide element capable of absorbing the e-liquid in the liquid storage chamber, an far-infrared radiating component on a radiation generating surface of a radiating light source generates far infrared light to irradiate the e-liquid on the atomization surface of the liquid guide element, and then the e-liquid is heated and atomized to generate an aerosol for a use to inhale. The efficiency of far infrared heating is high, and the time of preheating of the electronic cigarette is short; in addition, the sizes of the radiation generating surface of the radiating light source and the atomization surface on the liquid guide element may be adjusted according to needs, adapting to requirements of a large atomization surface, and the generated amount of aerosol smoke can satisfy user requirements, improving user experience.

BRIEF DESCRIPTION OF THE DRAWINGS

For a better understanding of the technical scheme in the embodiments of the present disclosure, accompanying drawings needed in the description of the embodiments are simply illustrated below. Obviously, the accompanying drawings described below are some embodiments of the present disclosure merely. For the ordinary skill in the field, other accompanying drawings may be obtained according to the structures shown in these accompanying drawings without creative work.

Figure 1:
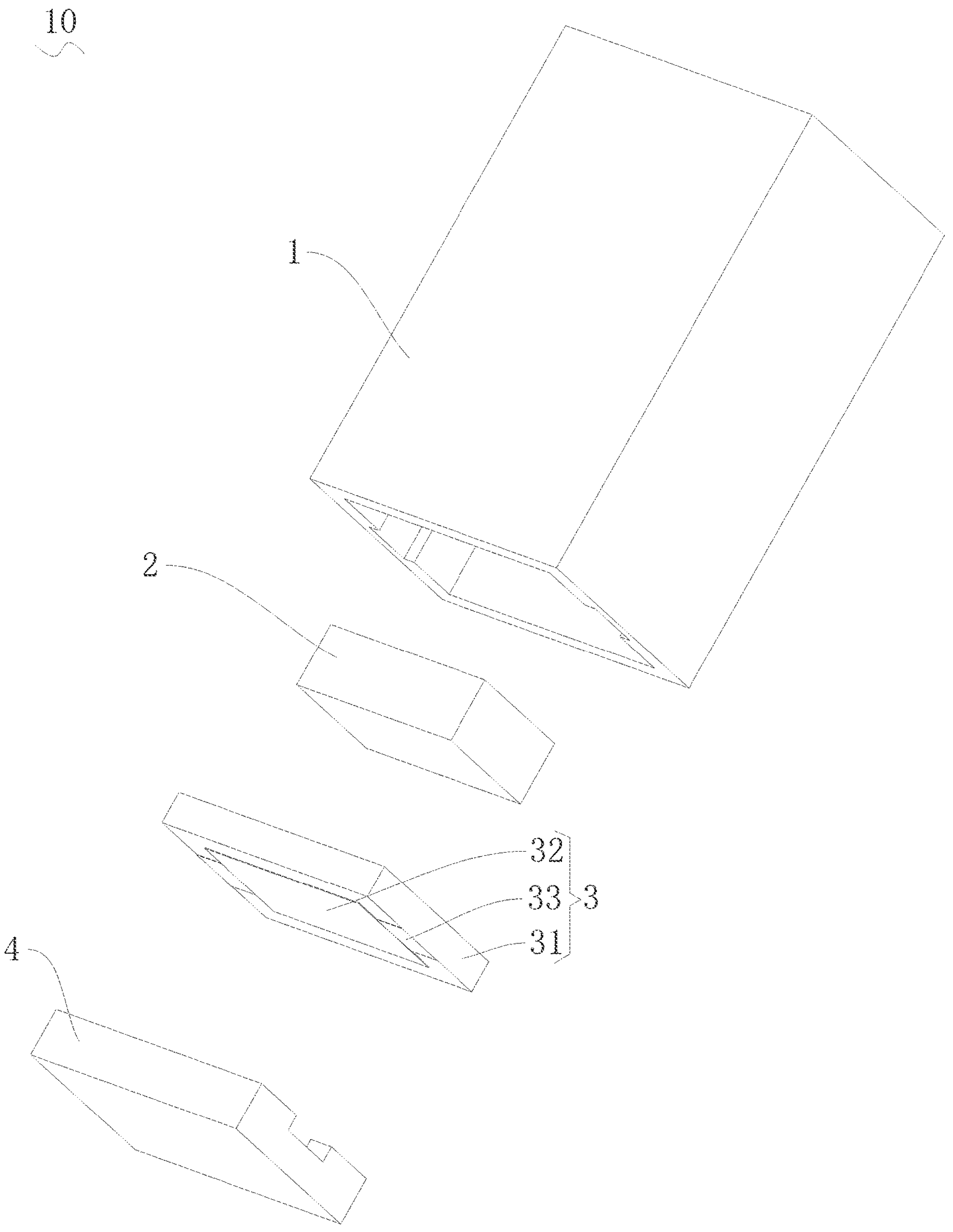
FIG. 1 is a structure diagram of decomposition of an atomizer according to one embodiment of the present disclosure.

In the drawings: 10 represents an atomizer, 1 represents a housing, 11 represents a liquid storage chamber, 12 represents a liquid outlet, 13 represents an air channel, 131 represents an air inlet section, 132 represents an atomization area, 133 represents an air outlet section, 2 represents a liquid guide element, 21 represents a liquid absorption surface, 22 represents an atomization surface, 3 represents a radiating light source, 31 represents a substrate, 311 represents a radiation generating surface, 32 represents a far-infrared radiating component, 33 represents a conductive portion, 331 represents a conductive coating, 3311 represents a positive electrode coating, 3312 represents a negative electrode coating, 332 represents a conductive sheet, 3321 represents a positive electrode sheet, 3322 represents a negative electrode sheet, 34 represents a light source, 35 represents a filter sheet, 36 represents a lampshade, 4 represents a heat insulation plate, 41 represents a groove, 42 represents a notch, 5 represents a far-infrared reflective coating, 20 represents a battery assembly, and 100 represents an electronic cigarette.

DETAILED DESCRIPTION

For a better understanding of the present disclosure, a detailed description is provided below to the present disclosure in conjunction with the drawings and specific embodiments. It is to be noted that when an element is described as "fixed on"/"fixedly connected to" another element, it may be directly on the another element, or there might be one or more intermediate elements between them. When one element is described as "connected to" another element, it may be directly connected to the another element, or there might be one or more intermediate elements between them. Terms "vertical", "horizontal", "left", "right," "inner", "outer" and similar expressions used in this description are merely for illustration.

Unless otherwise defined, all technical and scientific terms used in the description have the same meaning as those normally understood by the skill in the technical field of the present disclosure. The terms used in the description of the present disclosure are just for describing specific implementations, not to limit the present disclosure. Terms "and/or" used in the description include any and all combinations of one or more listed items.

In addition, technical features involved in different embodiments of the present disclosure described below can be combined mutually if no conflict is incurred.

In the description, the installation includes fixing or limiting one element or device to a particular position or place by means of welding, screwing, clamping, bonding and the like, the element or device can remain stationary at a specific position or place or move within a limited range, and the element or device can be or not be detached after fixed or limited to the particular position or place, which are not limited in the present disclosure.

Figure 2:
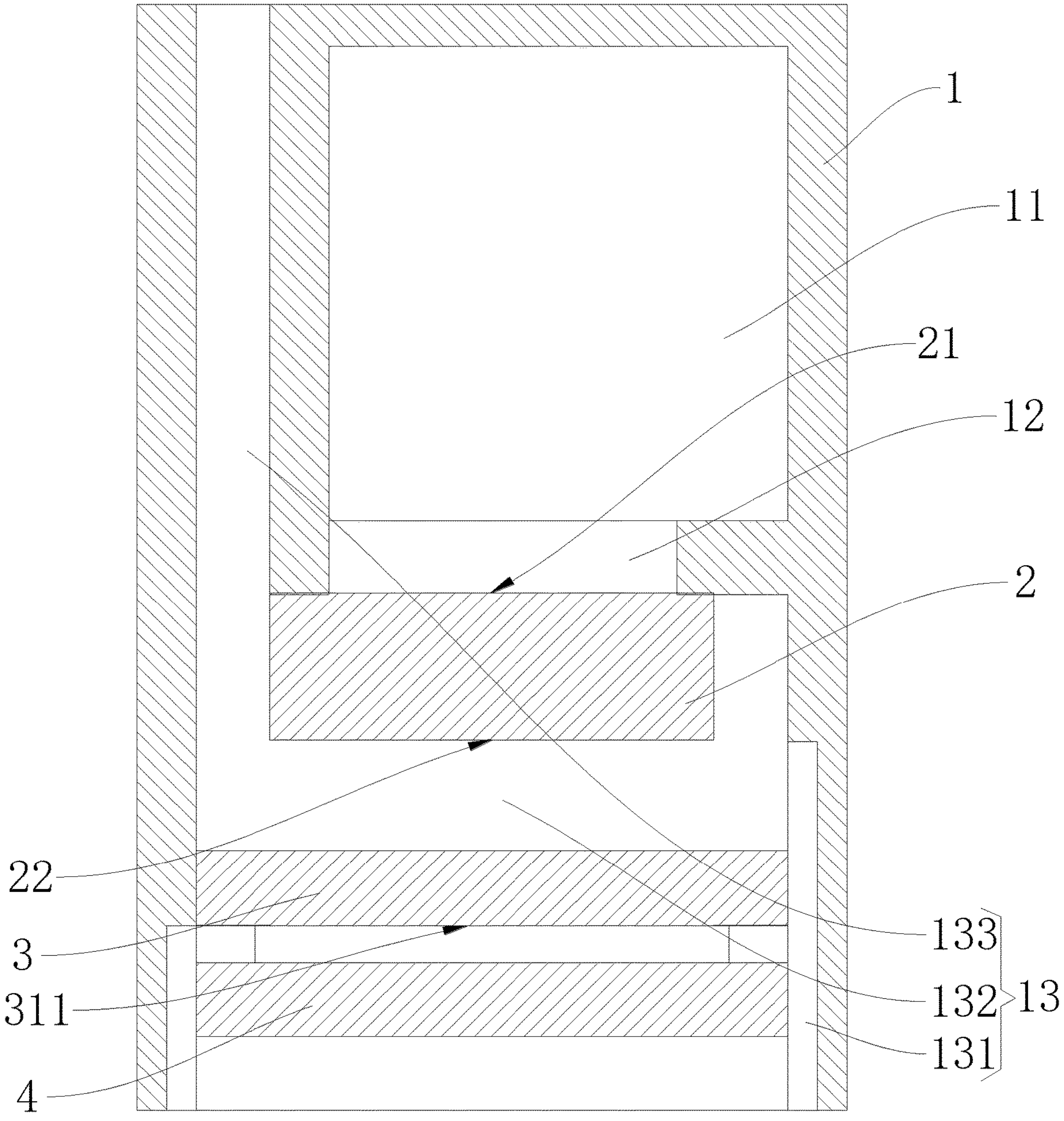
FIG. 2 is a sectional view of an atomizer according to one embodiment of the present disclosure.
Figure 3:
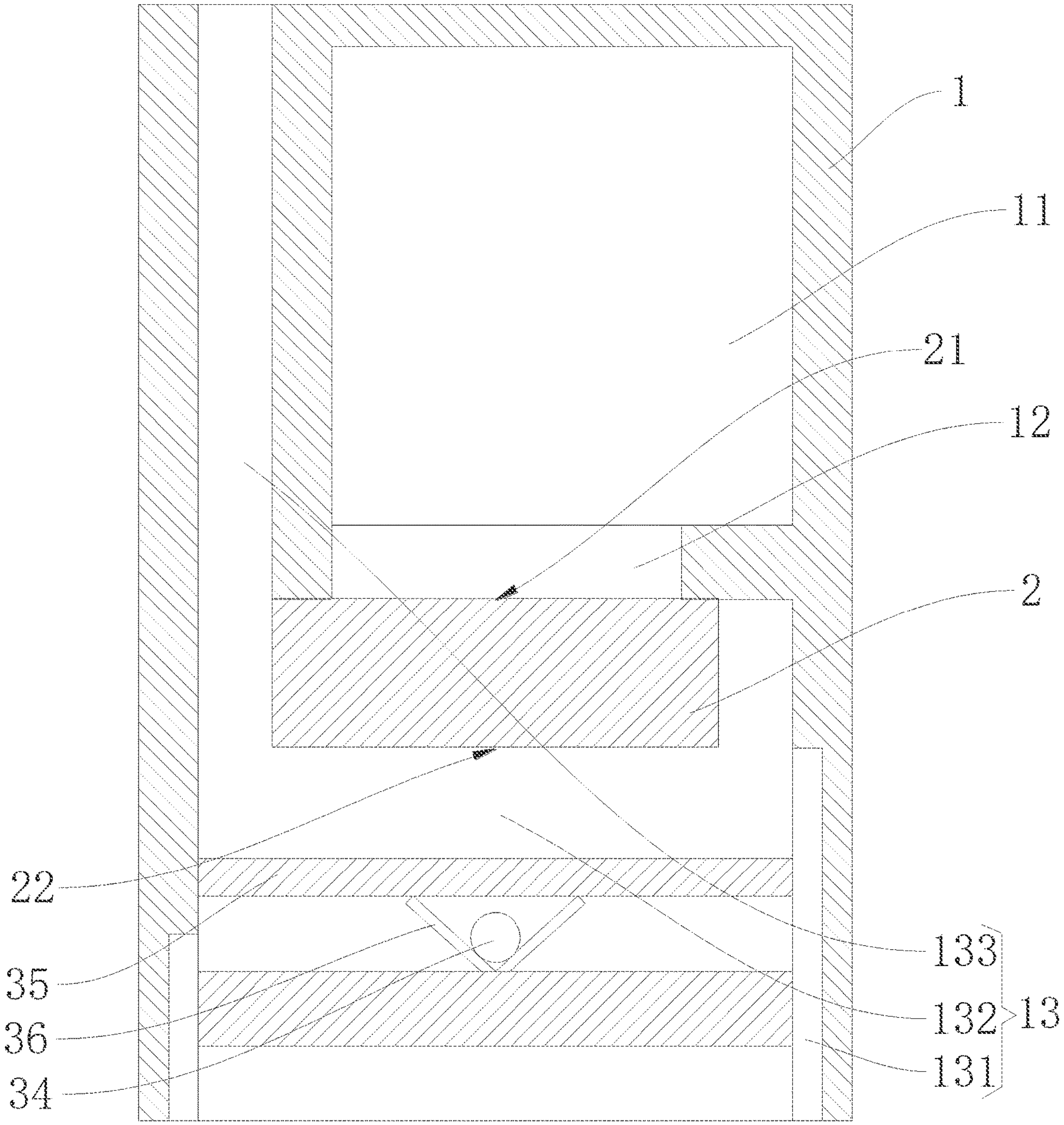
FIG. 3 is a sectional view of an atomizer according to another embodiment of the present disclosure.

Referring to FIG. 1 to FIG. 3, the atomizer 10 according to the embodiment of the present disclosure includes a housing 1, a liquid guide element 2 and a radiating light source 3.

The housing 1 is inside hollow to form a liquid storage chamber 11 configured for storing an e-liquid; the capacity of the liquid storage chamber 11 can be designed according to the specification of products, generally preferred 1-2 ml. Of course, the liquid storage chamber 11 may be arranged separated from the housing, that is, detachably arranged inside the housing 1, or may be integrated with the housing 1.

The liquid guide element 2 is disposed in the housing 1 and has an atomization surface 22, the liquid guide element 2 is configured for absorbing some e-liquid in the liquid storage chamber 11 and transferring the e-liquid to the atomization surface 22; preferably, the liquid guide element 2 includes at least one of microporous ceramic body, porous glass, cellucotton or foam metal, so as to absorb the e-liquid in the liquid storage chamber 11; the radiating light source 3 is arranged inside the housing 1 and is located on one side of the liquid guide element 2, the radiating light source 3 is capable of emitting far infrared light which radiates onto the atomization surface 22 of the liquid guide element 2, and the e-liquid is heated and atomized under the radiation of the far infrared light. Specifically, the radiating light source 3 has at least one radiation generating surface 311, the atomization surface 22 faces the radiating light source 3 and the radiating light source 3 is arranged spaced from the atomization surface 22 by a set distance, the radiation generating surface

311 has provided thereon a far-infrared radiating component 32, and the far-infrared radiating component 32 is configured for emitting far infrared light which at least partly radiates onto the atomization surface 22, so as to heat the e-liquid near the atomization surface 22 to generate an aerosol.

In the above atomizer 10, the radiating light source 3 is arranged spaced from the atomization surface 22, such that the e-liquid is heated not contacting the far-infrared radiating component 32, which, compared with the existing heating manner of directly contacting the e-liquid, can keep the radiating light source 3 clean; furthermore, as the e-liquid is heated through the radiation of far infrared light, the e-liquid aerosol can be stopped being generated immediately upon the far-infrared radiating component 32 stops radiating the far infrared light, which avoids the occurrence that the aerosol keeps generated after a user stops inhaling and thus affects the use experience.

Further, the radiation generating surface 311 and the atomization surface 22 preferably are straight planes, and the radiation generating surface 311 is parallel to the atomization surface 22, guaranteeing that the far infrared light emitted by the far-infrared radiating component 32 can accurately radiate onto the atomization surface 22. Of course, in some embodiments, it is possible that the radiation generating surface 311 is a straight plane while the atomization surface 22 is a spherical surface, or the radiation generating surface 311 is a spherical surface while the atomization surface 22 is a straight plane, etc.

In the present embodiment, the far-infrared radiating component 32 extends inside the radiation generating surface 311, and a projection of the far-infrared radiating component 32 on the atomization surface 22 at least covers the atomization surface 22, such that the whole atomization surface 22 is irradiated by the far infrared light, the generated amount of aerosol is larger, and the requirements of user are met.

In one embodiment, referring to FIG. 2 to FIG. 3, the liquid storage chamber 11 defines a liquid outlet 12 on one wall surface thereof, the liquid guide element 2 is arranged at the liquid outlet 12, the liquid guide element 2 further has a liquid absorption surface 21, the liquid absorption surface 21 faces the liquid outlet 12, and the e-liquid inside the liquid storage chamber 11 permeates into the liquid guide element 2 from the liquid absorption surface 21 and then is carried to the atomization surface 22, the far infrared light emitted by the radiating light source 3 radiates onto the atomization surface 22, and then the e-liquid is heated and atomized under the radiation of the far infrared light, that is, generating an aerosol for a user to inhale. Preferably, the liquid absorption surface 21 and the atomization surface 22 are arranged opposite to one another on the liquid guide element 2; taking the direction shown in FIG. 2 and FIG. 3 for example, if the liquid absorption surface 21 is an upper surface of the liquid guide element 2, the atomization surface 22 is a lower surface of the liquid guide element 2; if the liquid absorption surface 21 is a rear surface of the liquid guide element 2, the atomization surface 22 is a front surface of the liquid guide element 2. In the present embodiment, there is a sealing structure disposed between the liquid guide element 2 and the liquid outlet 12, for example, a rubber sealing ring or a silicone sealing ring and the like is arranged between the liquid guide element 2 and a wall surface of the liquid outlet 12 to achieve sealing, thereby preventing the e-liquid leaking.

Figure 4:
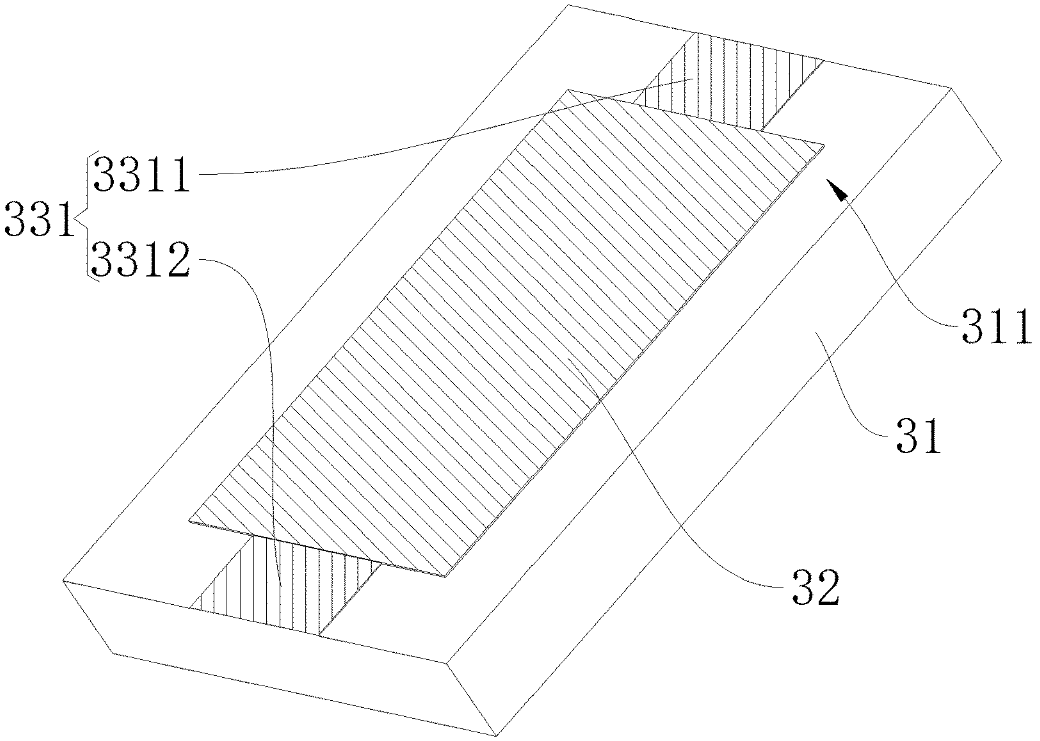
FIG. 4 is a structure diagram of a radiating light source according to one embodiment of the present disclosure.

Referring to FIG. 4, in one embodiment, the radiating light source 3 includes a substrate 31, wherein the substrate 31 is made of those materials capable of being transmitted by far infrared light, for example, high-temperature resistant and transparent materials such as quartz glass, ceramic or mica; the substrate 31 is arranged spaced from the liquid guide element 2, the radiation generating surface 311 is one surface of the substrate 31, the far-infrared radiating component 32 is a far-infrared coating applied on the radiation generating surface 311, and the far-infrared coating is capable of emitting far infrared light after electrified. In the present embodiment, the far-infrared coating applied on the radiation generating surface 311 has a uniform thickness, so as to emit far infrared lights of the same intensity to radiate onto the liquid guide element 2, and the e-liquid on the liquid guide element 2 can be uniformly heated. The far-infrared coating preferably is a mixture of far-infrared electrothermal ink, ceramic powder and inorganic adhesive that is fully stirred and then coated on the surface of the substrate 31 and finally is dried and cured for certain time, and the far-infrared coating has a thickness of 30 μm-50 μm. Of course, the far-infrared coating can also be other coating materials capable of emitting far infrared light, for example, the far-infrared coating can also be a mixture of tin tetrachloride, tin oxide, antimony trichloride, titanium tetrachloride and anhydrous copper sulfate in certain proportion that is stirred and then coated on the outer surface of the substrate 31; or the far-infrared coating is one of silicon carbide ceramic layer, carbon fiber composite layer, zirconium titanium oxide ceramic layer, zirconium titanium nitride ceramic layer, zirconium titanium boride ceramic layer, zirconium titanium carbide ceramic layer, iron oxide ceramic layer, iron nitride ceramic layer, iron boride ceramic layer, iron carbide ceramic layer, rare earth oxide ceramic layer, rare earth nitride ceramic layer, rare earth boride ceramic layer, rare earth carbide ceramic layer, nickel cobalt oxide ceramic layer, nickel cobalt nitride ceramic layer, nickel cobalt boride ceramic layer, nickel cobalt carbide ceramic layer or high silicon molecular sieve ceramic layer; the far-infrared coating can also be other existing material coatings.

The above radiating light source 3 applies a far-infrared coating on one surface of the substrate 3, and the far-infrared coating, after electrified, directly generates far infrared light, which radiates onto the atomization surface 22 of the liquid guide element 2 so that the e-liquid is under radiation and then heated and atomized to generate an aerosol; compared with the existing heating technology that a heating element is heated for irradiating a quartz tube to generate infrared light which then irradiates and heats the e-liquid, the radiating light source 3 is simpler in structure and higher in heating efficiency.

Further, the shape that the far-infrared coating presents on the radiation generating surface 311 is matched with the shape of the atomization surface 22 of the liquid guide element 2, for example, if the atomization surface 22 presents a rectangle, the far-infrared coating presents a rectangle too; if the atomization surface 22 presents a circle, the far-infrared coating presents a circle too; if the atomization surface 22 presents an oval, the far-infrared coating presents an oval too; in this way, the far infrared light emitted by the radiating light source 3 radiates onto the atomization surface 22 only, which avoids the occurrence that the far infrared light emitted by the radiating light source 3 radiates onto other areas inside the housing 1 to cause the housing 1 to be overheated, and thus ensures the use experience of the product.

Referring to FIG. 1 to FIG. 3, in the above embodiment, the radiation generating surface 311 is a surface on one side of the substrate 31 away from the atomization surface 22, and the infrared light emitted by the far-infrared coating after the far-infrared coating is electrified passes through the substrate 31 to radiate onto the atomization surface 22. The far-infrared coating is applied on a surface on one side of the substrate 31 away from the liquid guide element 2 (that is, the radiation generating surface 311), and the infrared light emitted by the far-infrared coating after the far-infrared coating is electrified passes through the substrate 31 to radiate onto the atomization surface 22 of the liquid guide element 2 to irradiate and heat the e-liquid, which can avoid the occurrence that the e-liquid drops onto the far-infrared coating to result in an incapability of the far-infrared coating in normally emitting far infrared light which irradiates and heats the e-liquid on the liquid guide element 2.

In the above embodiment, referring to FIG. 1, the radiating light source 3 further includes a conductive portion 33, and the conductive portion 33 is arranged on the substrate 31 and is in electrical connection with the far-infrared coating. The conductive portion 33 may be in electrical connection with an external power source to supply power to the far-infrared coating. Specifically, in one embodiment, referring to FIG. 4, the conductive portion 33 is a conductive coating 331 applied on the substrate 31, the conductive coating 331 includes a positive electrode coating 3311 and a negative electrode coating 3312, and both the positive electrode coating 3311 and the negative electrode coating 3312 are in electrical connection with the far-infrared coating. Preferably, both the positive electrode coating 3311 and the negative electrode coating 3312 are applied on the radiation generating surface 311 and located at two opposite sides of the far-infrared coating. The conductive coating 331 may be a metal oxide coating, such as aluminum oxide, copper oxide, silver oxide, etc. During production and processing, the substrate 31 can be coated with a far-infrared coating, and the position of the conductive coating 331 can be first coated with a far-infrared coating and then a conductive coating, to ensure that the conductive coating 331 is in tight contact with the far-infrared coating, thereby by keeping the continuity of electrical connection, avoiding the conductive coating 331 being in poor contact with the far-infrared coating to result in an incapability of the far-infrared coating in normally emitting lights.

Figure 5:
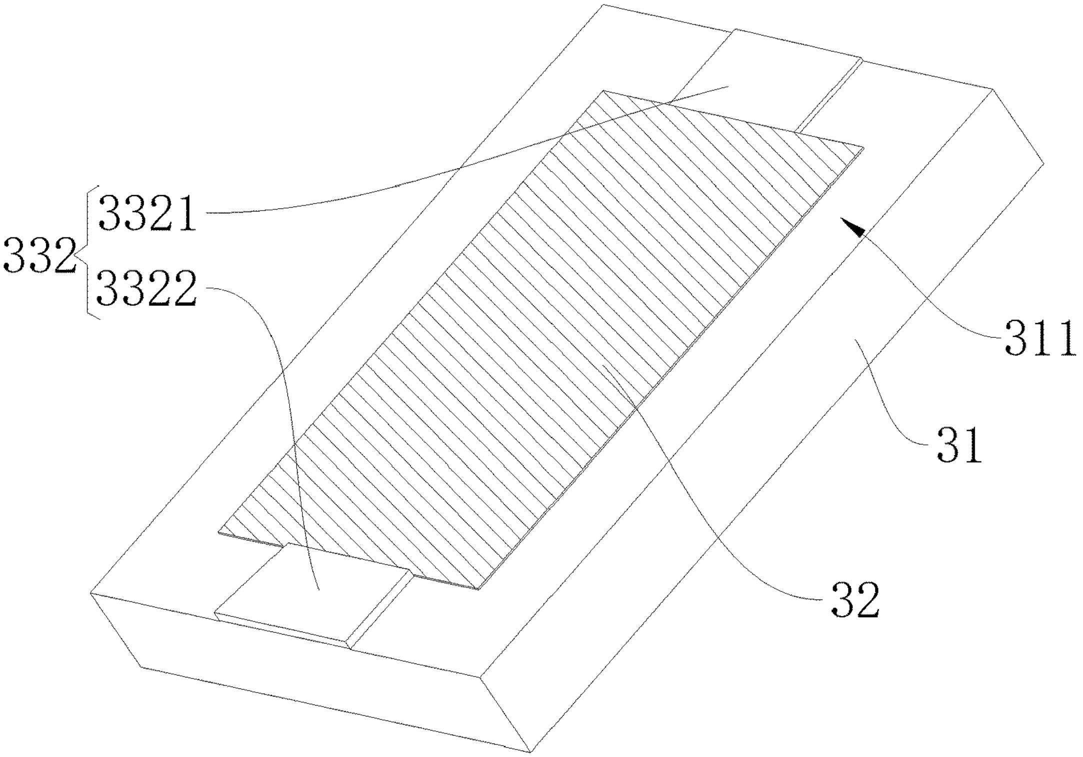
FIG. 5 is a structure diagram of a radiating light source according to another embodiment of the present disclosure.

In another embodiment, referring to FIG. 5, the conductive portion 33 is a conductive sheet 332 arranged on the substrate 31, the conductive sheet 332 includes a positive electrode sheet 3321 and a negative electrode sheet 3322, and both the positive electrode sheet 3321 and the negative electrode sheet 3322 are in electrical connection with the far-infrared coating. The conductive sheet 332 can be a copper sheet, steel sheet, etc. In the present embodiment, the conductive sheet 332 can be sheet like, or ring like. The ring like conductive sheet 332 defines a hole, so as to be sleeved on the substrate 31 to electrically connect to the far infrared coating. The ring like conductive sheet 332 can be directly stuck on the substrate 31.

It is worth mentioning that the radiating light source 3 can also include a light source 34 and a filter sheet 35, wherein the filter sheet 35 allows the far infrared light to pass through only and absorbs other lights, only the far infrared light is remained after the lights emitted by the light source 34 pass through the filter sheet 35, and the far infrared light radiates onto the liquid guide element 2 to irradiate and heat the e-liquid. Specifically, the radiating light source 3 can also include a lampshade 36 which limits the direction of irradiation of the light source 34, the lampshade 36 can make the light emitted by the light source 34 focused on the surface of the filter sheet 35, to improve the efficiency of utilization of energy. Of course, in some other embodiments, the radiating light source 3 can be a quartz tube, an infrared bulb, a wire tube, etc., and it is just needed to employ a product of an appropriate size according to the structure of the atomizer 10.

Referring to FIG. 1 to FIG. 3, the atomizer 10 further includes a heat insulation plate 4, wherein the heat insulation plate 4 is arranged on one side of the radiating light source 3 away from the atomization surface 22. The heat insulation plate 4, on one hand, can prevent the far infrared light emitted by the radiating light source 3 irradiating other parts inside the housing 1 in a direction away from the liquid guide element 2 and thus avoid the atomizer 1 being overheated locally, and, on the other hand, can function as insulation to avoid the occurrence that the heat generated by the e-liquid on the liquid guide element 2 under heat radiation is transferred to other parts inside the atomizer 10. Further, one side of the heat insulation plate 4 close to the radiation generating surface 311 has a far-infrared reflective coating 5 applied thereon, and the far-infrared reflective coating 5 is configured for reflecting the far infrared light emitted by the far-infrared radiating component 3. The far-infrared reflective coating 5 can reflect the infrared light emitted by the radiating light source 3 back to the substrate 31, and then the infrared light passes through the substrate 31 to radiate onto the liquid guide element 2 to irradiate and heat the e-liquid, to further improve the efficiency of heating. Further, referring to FIG. 6, the heat insulation plate 4 presses against the radiating light source 3, one side of the heat insulation plate 4 close to the radiation generating surface 311 defines a groove 41, and the far-infrared reflective coating 5 is disposed inside the groove 41; in the present embodiment, the heat insulation plate 4 presses against the substrate 31, and by disposing the far-infrared reflective coating 5 inside the groove 41, the assembly thickness can be reduced and the structure is more compact; moreover, the far-infrared reflective coating 5 can effectively reflect the far infrared light emitted by the far-infrared coating on the substrate 31.

Figure 6:
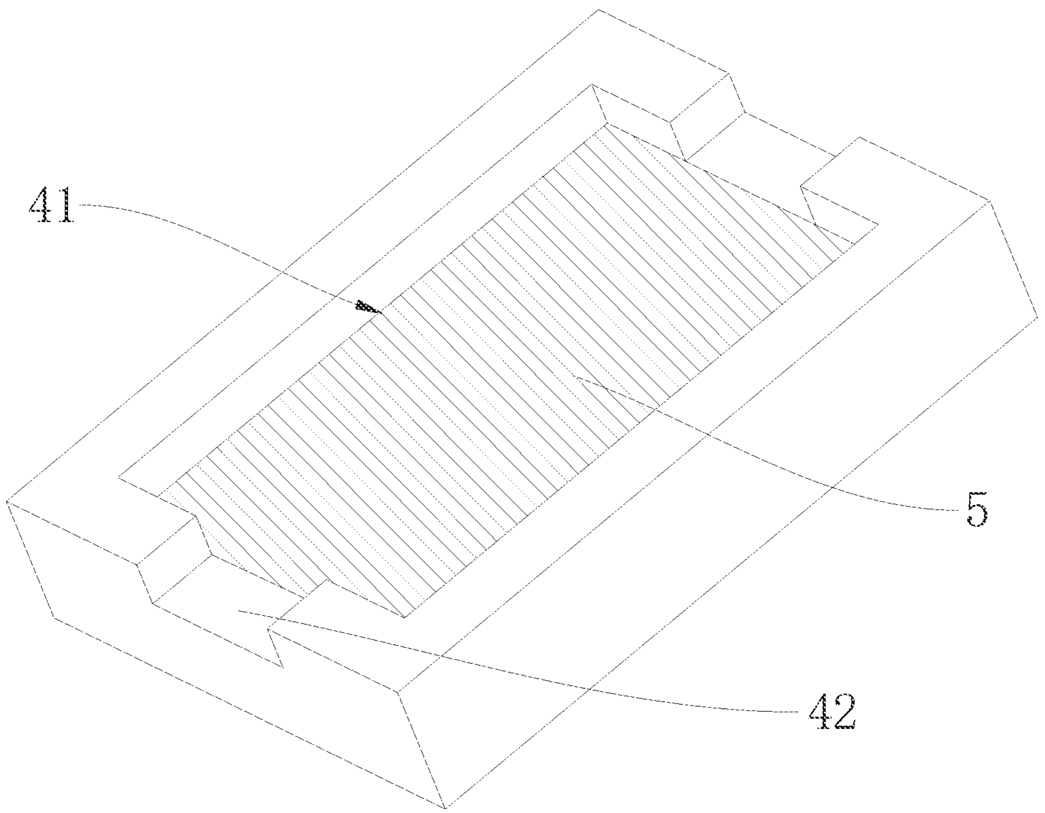
FIG. 6 is a structure diagram of a heat insulation plate according to one embodiment of the present disclosure.

Referring to FIG. 6, the heat insulation plate 4 further defines a notch 42 on a position corresponding to the conductive coating 331 or conductive sheet 331, wherein there are two notches 42, which are defined opposite one another on two sides of the groove 41. By defining the notch 42, enough space can be remained for assembly, so that the conductive coating 331 or conductive sheet 332 is connected to an external power source through a lead.

In the present embodiment, the heat insulation plate 4 can be an inside vacuumized plate body made of stainless steel, also can be a plate body filled with an aerogel inside, wherein the aerogel can be silicon, carbon, sulfur, metal oxide and metal series of aerogel; since the aerogel has over 80% volume of air in it, the heat insulation effect is very good.

Referring to FIG. 2 to FIG. 3, the housing 1 further defines an air channel 13, an atomization area 132 formed by an interval between the liquid guide element 2 and the radiating light source 3 forms one portion of the air channel 13; the aerosol escapes from the atomization surface 22 and is released into the atomization area 132, and then is discharged out of the atomizer 10 via the air channel 13 for a user to inhale. Specifically, the air channel 13 includes an air inlet section 131, an atomization area 132 and an air outlet section 133 that are communicated in sequence, the radiating light source 3 and the liquid guide element 2 are arranged spaced on two opposite sides of the atomization area 132, the air outside the housing 1 flows into the housing 1 via the air inlet section 131, passes through the atomization area 132 and then is discharged out of the housing 1 via the air outlet section 133 to carry away the aerosol in the atomization area 132. In the present embodiment, the air outlet section 133 and the atomization area 132 together present an L shape, the atomization surface 22 of the liquid guide element 2 is located inside the atomization area 132, the far infrared light emitted by the radiating light source 3 goes into the atomization area 132 and then radiates onto the atomization surface 22 of the liquid guide element 2, then the e-liquid on the atomization surface 22 is heated under radiation and atomized to generate an aerosol, which, driven by the air flowing into the air inlet section 131, is discharged out of the housing 1 via the air outlet section 133 for a user to inhale.

Figure 7:
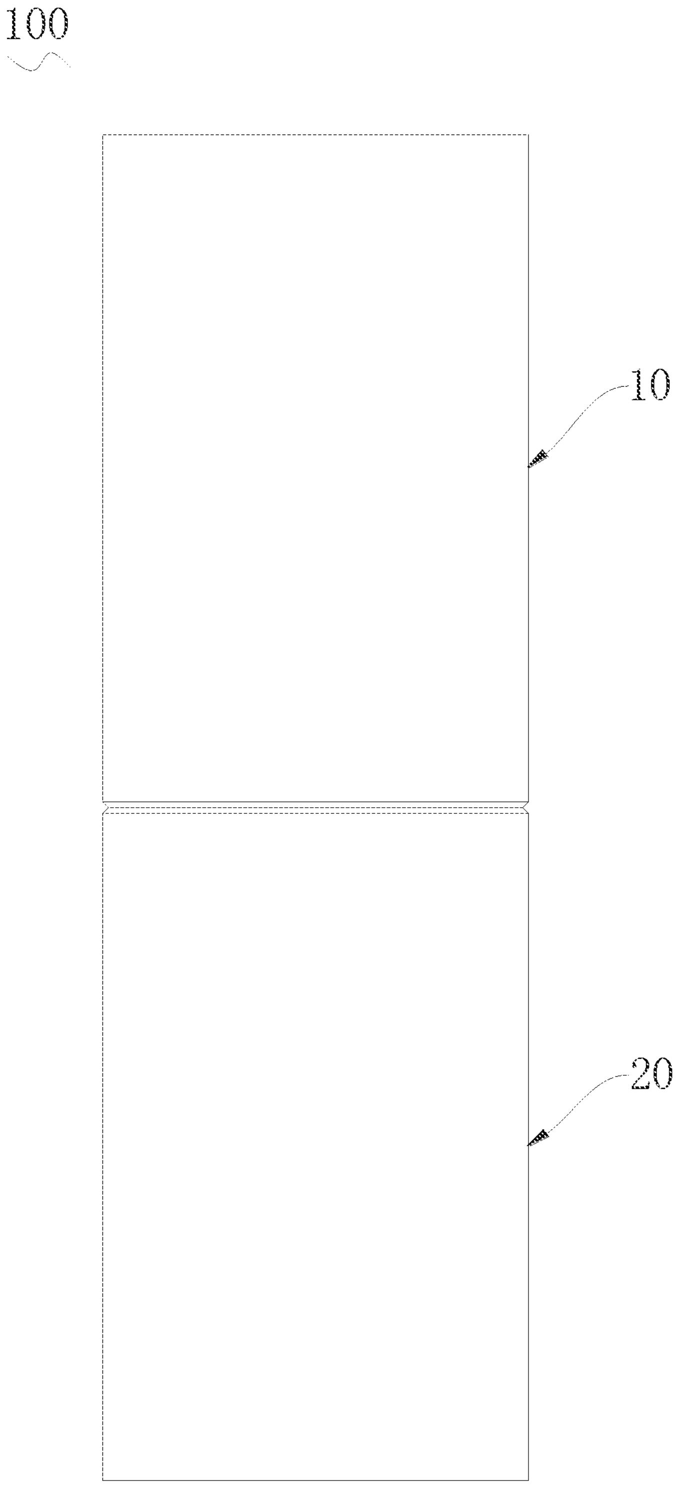
FIG. 7 is a structure diagram of an electronic cigarette according to one embodiment of the present disclosure.

Referring to FIG. 7, the embodiment of the present disclosure further provides an electronic cigarette 100, including an atomizer 10 and a battery assembly 20, wherein the battery assembly 20 is configured for supplying power to the atomizer 10, and the atomizer is any one described above. According to the electronic cigarette 100 provided in the present embodiment, inside the housing 1 are provided a liquid storage chamber 11 and an liquid guide element 2 capable of absorbing the e-liquid in the liquid storage chamber 11, an far-infrared radiating component 32 on a radiation generating surface 311 of a radiating light source 3 generates far infrared light to irradiate the e-liquid on the atomization surface 22 of the liquid guide element 2, and then the e-liquid is heated and atomized to generate an aerosol for a use to inhale. The efficiency of far infrared heating is high, and the time of preheating of the electronic cigarette 100 is short; in addition, the sizes of the radiation generating surface 311 of the radiating light source 3 and the atomization surface 22 on the liquid guide element 2 may be adjusted according to needs, adapting to requirements of a large atomization surface, and the generated amount of aerosol smoke can satisfy user requirements, improving user experience.

It is to be noted that the description and the accompanying drawings of the present disclosure just illustrate some preferred embodiments of the present disclosure. The present disclosure may, however, be exemplified in many different forms and should not be construed as being limited to the specific embodiments set forth herein. These embodiments should not be considered as an additional restriction to the content of the present disclosure. Rather, these embodiments are provided so that this disclosure will be thorough and complete. Moreover, various embodiments not listed above that are formed by combining the above technical features with each other shall be regarded as the scope covered by the description of the present disclosure. Furthermore, for the ordinary staff in the art, improvements or transformations can be made according to the above description, and these improvements and transformations are intended to be included in the scope of protection of claims appended hereinafter.

The invention claimed is:

1. An atomizer, comprising:

a housing, which is provided with a liquid storage chamber configured for storing an e-liquid;

a liquid guide element, which is disposed in the housing, wherein the liquid guide element has an atomization surface, the liquid guide element is configured for absorbing some e-liquid in the liquid storage chamber and is capable of transferring the e-liquid to the atomization surface;

and a radiating light source, which has at least one radiation generating surface, wherein the atomization surface faces the radiating light source and the radiating light source is arranged spaced from the atomization surface by a set distance, the radiation generating surface has provided thereon a far-infrared radiating component, and the far-infrared radiating component is configured for emitting far infrared light which at least partly radiates onto the atomization surface, so as to heat the e-liquid near the atomization surface to generate an aerosol, wherein the radiating light source comprises a substrate capable of being transmitted by far infrared light, the substrate is arranged spaced from the liquid guide element, the radiation generating surface is one surface of the substrate, the far-infrared radiating component is a far-infrared coating applied on the radiation generating surface, and the far-infrared coating is capable of emitting far infrared light after electrified.

2. The atomizer according to claim 1, wherein the radiation generating surface and the atomization surface are both straight planes, and the radiation generating surface is parallel to the atomization surface.

3. The atomizer according to claim 1, wherein the far-infrared radiating component extends inside the radiation generating surface, and a projection of the far-infrared radiating component on the atomization surface at least covers the atomization surface.

4. The atomizer according to claim 1, wherein the liquid storage chamber defines a liquid outlet, the liquid guide element further has a liquid absorption surface, the liquid absorption surface faces the liquid outlet, and the e-liquid inside the liquid storage chamber permeates to the atomization surface from the liquid absorption surface.

5. The atomizer according to claim 1, wherein the liquid guide element comprises at least one of microporous ceramic body, porous glass, cellucotton and foam metal.

6. The atomizer according to claim 1, wherein the radiation generating surface is a surface on one side of the substrate away from the atomization surface, and the infrared light emitted by the far-infrared coating after the far-infrared coating is electrified passes through the substrate to radiate onto the atomization surface.

7. The atomizer according to claim 1, wherein the radiating light source further comprises a conductive portion, and the conductive portion is arranged on the substrate and is in electrical connection with the far-infrared coating.

8. The atomizer according to claim 7, wherein the conductive portion is a conductive coating applied on the substrate, the conductive coating comprises a positive electrode coating and a negative electrode coating, and both the positive electrode coating and the negative electrode coating are in electrical connection with the far-infrared coating.

9. The atomizer according to claim 7, wherein the conductive portion is a conductive sheet arranged on the substrate, the conductive sheet comprises a positive electrode sheet and a negative electrode sheet, and both the positive electrode sheet and the negative electrode sheet are in electrical connection with the far-infrared coating.

10. The atomizer according to claim 1, further comprising a heat insulation plate, wherein the heat insulation plate is arranged on one side of the radiating light source away from the atomization surface.

11. The atomizer according to claim 10, wherein one side of the heat insulation plate close to the radiation generating surface has a far-infrared reflective coating applied thereon, and the far-infrared reflective coating is configured for reflecting the far infrared light emitted by the far-infrared radiating component.

12. The atomizer according to claim 11, wherein the heat insulation plate presses against the radiating light source, one side of the heat insulation plate close to the radiation generating surface defines a groove, and the far-infrared reflective coating is disposed inside the groove.

13. The atomizer according to claim 1, wherein the housing further defines an air channel, an atomization area formed by an interval between the liquid guide element and the radiating light source forms one portion of the air channel, and the aerosol escapes from the atomization surface and is released into the atomization area.

14. The atomizer according to claim 13, wherein the air channel comprises an air inlet section, an atomization area and an air outlet section that are communicated in sequence, the radiating light source and the liquid guide element are arranged spaced on two opposite sides of the atomization area, and the air outside the housing flows into the housing via the air inlet section, passes through the atomization area and then is discharged out of the housing via the air outlet section to carry away the aerosol in the atomization area.

15. An electronic cigarette, comprising an atomizer and a battery assembly, wherein the battery assembly is configured for supplying power to the atomizer, and the atomizer comprising:

a housing, which is provided with a liquid storage chamber configured for storing an e-liquid;

a liquid guide element, which is disposed in the housing, wherein the liquid guide element has an atomization surface, the liquid guide element is configured for absorbing some e-liquid in the liquid storage chamber and is capable of transferring the e-liquid to the atomization surface;

and a radiating light source, which has at least one radiation generating surface, wherein the atomization surface faces the radiating light source and the radiating light source is arranged spaced from the atomization surface by a set distance, the radiation generating surface has provided thereon a far-infrared radiating component, and the far-infrared radiating component is configured for emitting far infrared light which at least partly radiates onto the atomization surface, so as to heat the e-liquid near the atomization surface to generate an aerosol, wherein the radiating light source comprises a substrate capable of being transmitted by far infrared light, the substrate is arranged spaced from the liquid guide element, the radiation generating surface is one surface of the substrate, the far-infrared radiating component is a far-infrared coating applied on the radiation generating surface, and the far-infrared coating is capable of emitting far infrared light after electrified.

16. An electronic cigarette according to claim 15, wherein the radiation generating surface and the atomization surface are both straight planes, and the radiation generating surface is parallel to the atomization surface.

17. An electronic cigarette according to claim 15, wherein the far-infrared radiating component extends inside the radiation generating surface, and a projection of the far-infrared radiating component on the atomization surface at least covers the atomization surface.

18. An electronic cigarette according to claim 15, wherein the liquid storage chamber defines a liquid outlet, the liquid guide element further has a liquid absorption surface, the liquid absorption surface faces the liquid outlet, and the e-liquid inside the liquid storage chamber permeates to the atomization surface from the liquid absorption surface.

19. An electronic cigarette according to claim 15, wherein the liquid guide element comprises at least one of microporous ceramic body, porous glass, cellucotton and foam metal.

* * * * *